Sept. 21, 1965  C. DE BOER ETAL  3,207,750
DERIVATIVES OF DECOYININE
Filed May 29, 1964  2 Sheets-Sheet 1
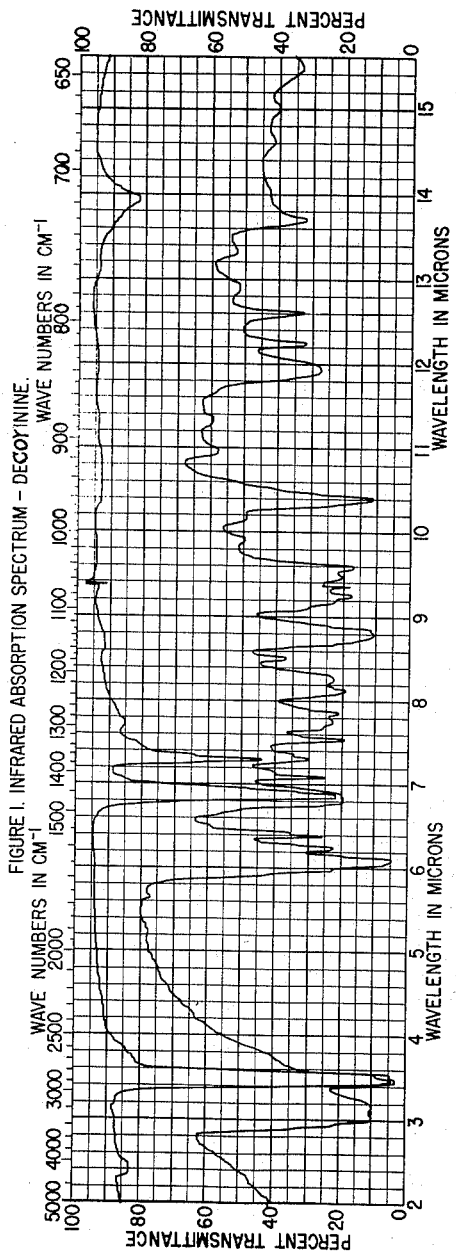
CLARENCE DE BOER
ALMA DIETZ
LEROY E. JOHNSON
THOMAS E. EBLE
HERMAN HOEKSEMA
*INVENTORS*
BY E. O. RETTER
G. T. JOHANNESEN

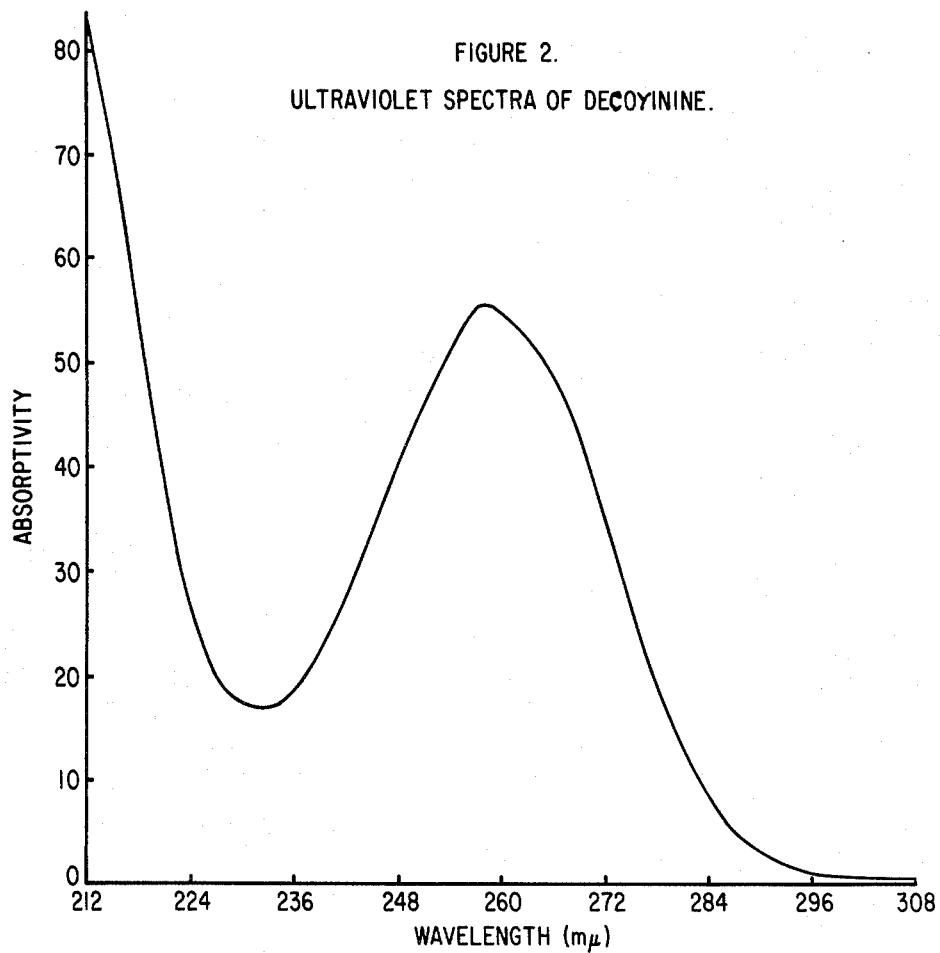

United States Patent Office 3,207,750
Patented Sept. 21, 1965

3,207,750
DERIVATIVES OF DECOYININE
Clarence De Boer, Alma Dietz, Le Roy E. Johnson, and Thomas E. Eble, Kalamazoo, and Herman Hoeksema, Cooper Township, Kalamazoo County, Mich., assignors to The Upjohn Company, Kalamazoo, Mich., a corporation of Delaware
Filed May 29, 1964, Ser. No. 371,892
16 Claims. (Cl. 260—211.5)

This invention relates to a novel composition of matter and to the process for the production thereof. More particularly this invention relates to a new compound, decoyinine (antibiotic al4), and to the process for the production thereof.

This application is a continuation-in-part of the pending applications of De Boer et al., Serial Nos. 787,967 (U.S. Patent 3,094,460) and 197,159, filed May 23, 1962 and now abandoned.

Decoyinine is an elaboration product of *Streptomyces hygroscopicus* var. *decoyicus* having the property of adversely affecting growth of various organisms, particularly bacteria and fungi. It is distinguished from konwn antibacterial agents and antibiotics by its characteristic infrared and ultraviolet spectra, shown respectively in FIGURES 1 and 2, by its elemental constitution, and by its chemical and physical properties. Decoyinine has the following molecular and structural formulae:

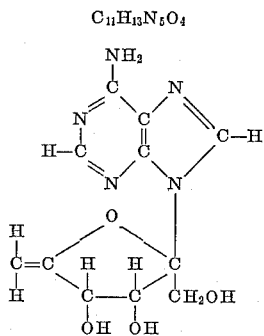

$C_{11}H_{13}N_5O_4$

A culture of the living organism hereinafter identified as *Streptomyces hydroscopicus* var. *decoyicus* has been deposited with the Fermentation Division, Northern Utilization Research Branch, U.S. Department of Agriculture, Peoria, Illinois, and has been added to its permanent collection as NRRL–2666.

*Streptomyces hydroscopicus* var. *decoyicus* is a new from a soil sample taken at Verdugo City, California. Its cultures have a branching aerial mycelia, produce conidia in tightly coiled hyphae arising from the aerial mycelium, and develop moist black patches in the sporulating areas as the culture ages.

*Streptomyces hydroscopicus* var. *decoyicus* shows close similarities to *Streptomyces endus* and *Streptomyces hygroscopicus* CBS as shown in Table I and II. In Table I, these organisms are compared by the Dietz Ektachrome (positive color film transparencies) technique, noted in the Annals of the New York Academy of Science, vol. 60, art. 1, pp. 152 and 154, October 29, 1954.

TABLE I
Ektachrome comparison

| Medium | *Streptomyces hygroscopicus* var. *decoyicus* NRRL–2666 | | *Streptomyces endus* NRRL 2339 | | *Streptomyces hygroscopicus* CBS [1] | |
|---|---|---|---|---|---|---|
| | Surface | Reverse | Surface | Reverse | Surface | Reverse |
| Bennett's | Gray white | Honey tan | Gray white | Deep honey tan | Gray flecked with white | Deep honey tan. |
| Czapek's sucrose | Gray white | Honey tan with gray. | Fair gray white. | Pale honey tan flecked with gray. | Fair gray white | Pale honey tan flecked with gray. |
| Maltose tryptone | do | do | White flecked with gray. | Honey tan | Gray white | Deep tan. |
| Peptone iron | White | Honey tan | White | do | White | Honey tan. |
| Waksman's tyrosine | do | Colorless | do | Pale honey tan | do | Pale honey tan. |
| Casein starch | Gray | Pale honey tan | do | do | Gray flecked with white. | Pale honey tan flecked with gray. |

[1] CBS is Centraalbureau voor Schimmelculture at Baarn, Holland.

In Table II, these organisms are compared according to their ability to utilize carbon compounds by the procedure of Pridham and Gottlieb [J. Bact. 56: 107–114 (1948)] with the modifications noted in the printed German patent application No. 1,042,841.

TABLE II
Carbon assimilation

| Carbon Compounds | S. hygroscopicus var. decoyicus NRRL–2666 | S. endus NRRL–2339 | S. hygroscopicus CBS |
|---|---|---|---|
| Control | (−) | (−) | (−) |
| 1. d-Xylose | (+) | + | + |
| 2. l-Arabinose | (+) | + | + |
| 3. Rhamnose | (−) | + | + |
| 4. d-Fructose | (+) | + | + |
| 5. d-Galactose | (+) | + | + |
| 6. d-Maltose | (+) | + | + |
| 7. d-Mannose | + | + | + |
| 8. d-Glucose | (+) | + | + |
| 9. Sucrose | (+) | (+) | (+) |
| 10. Lactose | + | + | + |
| 11. Cellobiose | (+) | + | + |
| 12. Raffinose | + | + | + |
| 13. Dextrin | (+) | + | + |
| 14. Inulin | + | (+) | (+) |
| 15. Soluble starch | + | (+) | (+) |
| 16. Glycerol | (−) | + | + |
| 17. Dulcitol | (+) | + | (+) |
| 18. d-Mannitol | (+) | + | + |
| 19. d-Sorbitol | (+) | (+) | + |
| 20. dl-Inositol | (+) | (+) | (+) |
| 21. Salicin | (+) | (+) | (+) |
| 22. Phenol | − | − | − |
| 23. Cresol | − | − | − |
| 24. Sodium formate | (−) | (−) | (−) |
| 25. Sodium oxalate | (−) | (−) | (−) |
| 26. Sodium tartrate | (−) | (−) | (−) |
| 27. Sodium salicylate | − | − | − |
| 28. Sodium acetate | (+) | + | (+) |
| 29. Sodium citrate | (+) | + | + |
| 30. Sodium succinate | (+) | (+) | + |

+Positive assimilation; −negative assimilation; (−) negative assimilation, but only slight growth; (+) positive assimilation, but only slight growth.

Neither *S. endus* nor *S. hygroscopicus* CBS, under conditions suitable for the production of decoyinine, produce decoyinine.

Further characteristics of *Streptomyces hygroscopicus* var. *decoyicus* are listed in Table III, which shows the characteristic growth of the organism at 28° C. on sixteen variety of a known actinomycete which has been isolated standard media.

TABLE III

*Growth characteristic*

| Medium [1] | Vegetative Growth | Aerial Growth | Other |
|---|---|---|---|
| 1. Bennett's agar | Good | Good. Mottled white to gray to black. | Yellow reverse and pigment. |
| 2. Czapek's sucrose agar | ___do___ | Good. Two kinds of colonies: (a) with gray aerial growth, (b) white crackled. | Cream reverse. Pale yellow pigment. |
| 3. Maltose tryptone agar | ___do___ | ___do___ | Yellow to gray reverse. Yellow pigment. |
| 4. Peptone iron agar | Fair | None to trace white | Yellow reverse and pigment. |
| 5. 0.1% Tyrosine agar | ___do___ | Fair gray white | Tan reverse and pigment. |
| 6. Casein starch agar | ___do___ | Trace gray white | Colorless reverse. Good starch hydrolysis. |
| 7. Nutrient starch agar | ___do___ | Fair white | Cream reverse. Good starch hydrolysis. |
| 8. Skim milk agar | Good | ___do___ | Cream reverse. Good casein hydrolysis. |
| 9. Calcium malate agar | Fair | Trace gray white | Colorless reverse. |
| 10. Glucose asparagine agar | ___do___ | None | Do. |
| 11. Plain gelatin stab | ___do___ | ___do___ | Yellow pigment. Very slight liquifaction. |
| 12. Nutrient gelatin stab | ___do___ | ___do___ | Do. |
| 13. Tryptone broth | Fair. Flocculent at base | ___do___ | |
| 14. Litmus Milk | Fair | Trace gray white | No peptonization. No change. |
| 15. Nutrient nitrate broth | Fair. Flocculent at base | None | No reduction. |
| 16. Synthetic nitrate broth | Fair. Few surface colonies. Flocculent at base. | Very slight trace white | Do. |

[1] The media are noted in the printed German patent application No. 1,042,841.

On Bennett's and Czapek's sucrose agar *S. hygroscopicus* var. *decoyicus* has good vegetative and aerial growth at 18–28° C. At 37° vegetative growth is good but wrinkled and pasty, and there is trace white aerial growth. The culture does not grow at 55° C.

*S. hygroscopicus* var. *decoyicus* is distinctly different from the reported variants of *S. hygroscopicus* in the literature both in regard to the characteristics of the organism and the antibiotics produced. Thus, while variants or strains of *S. hygroscopicus* are reported to produce other antibiotics; namely, hygromycins, marcomycin, carbomycin, hygroscopins, and angustmycins, these antibiotics are distinctly different from decoyinine, as shown by the following comparison:

TABLE IV

| | |
|---|---|
| Hygroscopin A | $C_{13}H_{24}N_2O_3$ |
| Hygroscopin B | $C_{15}H_{28}N_2O_3$ |
| Carbomycin | $C_{42}H_{67}NO_{16}$ |
| Hygromycin | $C_{12}H_{20}NO_{12}$ |
| Hygromycin B | $C_{15}H_{28}N_2O_{9-10}$ |
| Marcomycin | $C_{15}H_{30}N_2O_9$ |
| Angustmycin A | $C_{15}H_{18-20}N_6O_5$ |
| Angustmycin C | $C_{11}H_{15}N_5O_5$ |
| Decoyinine | $C_{11}H_{13}N_5O_4$ |

Angustmycins A and C which are reported to be produced by *S. hygroscopicus* 6A–704 by H. Yüntsen et al. in Japan Journal of Antibiotics, Series A, vol. 7, No. 4, August 1954, pages 113 and 116; Japan Journal of Antibiotics, Series A, December 1956, p. 195, and Bull. Agr. Chem. Soc. Japan, vol. 21, No. 4 pp. 261–262, 1957, also differ in other significant respects, as shown in the following Table V:

The organism, *S. hygroscopicus* No. 6A–706 that produces the Angustmycins, is also distinctly different from *S. hygroscopicus* var. *decoyicus*. The differences in carbon assimilation are shown in Table VI.

TABLE VI

*Carbon assimilation*

| | *S. hygroscopicus* var. 6A–704 (*) | *S. hygroscopicus* var. *decoyicus* (**) |
|---|---|---|
| Control | − | (−) |
| d-Xylose | − | (+) |
| l-Arabinose | − | (+) |
| Rhamnose | − | (−) |
| d-Galactose | ± | (+) |
| d-Glucose | + | (+) |
| Sucrose | ± | (+) |
| Lactose | ± | + |
| Raffinose | +(−) | + |
| d-Mannitol | + | (+) |
| dl-Inositol | − | (+) |
| Salicin | − | (+) |

Key*
    ++Good growth and positive utilization.
    +Moderately good growth and positive assimilation.
    ±Faint growth, probably possible assimilation.
    (−)Sometimes no growth, indefinite utilization.
    −No growth, no utilization.
Key**
    +Positive assimilation.
    −Negative assimilation, no growth.
    (−)Slight growth, no assimilation.
    (+)Positive assimilation, only slight growth.

Differences in growth characteristics are shown in Table VII.

TABLE V

| Characteristic | Compound | | |
|---|---|---|---|
| | Decoyinine | Angustmycin A | Angustmycin C |
| Empirical formula | $C_{11}H_{13}N_5O_4$ | $C_{14}H_{18-20}N_6O_5$ | $C_{11}H_{15}N_5O_5$. |
| Percent Nitrogen of anhydrous crystal | 25.03 | 23.60 | 23.19. |
| Melting point of anhydrous crystal | 183–186° C | 169.5–171° C | 202–204° C. |
| Optical properties | Active | Active | Inactive. |
| Titration equivalent | 283 | 340 | 307. |
| Molecular weight determination | 215–216 | 350–352 | 297. |
| Probable sugar moiety | $C_6H_{12}O_5$ | $C_8H_{10}O_5$ | Not known or reported. |
| Forms on acetylation | Penta-acetyl, M.P. 152–153° C<br>Tetra-acetyl, M.P. 65° C<br>Triacetyl, M.P. 188–189° C | Triacetyl, M.P. 188–188.5° C<br>Tetracetyl, M.P. 188–189° C | Not known or reported. |
| Forms on Hydrogenation—Both | Dihydro, M.P. 205–208° C<br>Deoxydihydro, M.P. 150–153° C | Only dihydro, M.P. 153–154° C | |

TABLE VII
Growth characteristics

| Media | Organism | |
|---|---|---|
| | S. hygroscopicus var. decoyicus NRRL-2666 | S. hygroscopicus var. 6A-704 |
| Glucose asparagine agar. | No aerial growth | White powdery aerial growth. |
| Tyrosine agar | Pigment | No soluble pigment. |
| Gelatin stab | Yellow pigment | No soluble pigment formed. |
| Bennett's agar | Yellow reverse and pigment. | Growth brown, no soluble pigment. |

Decoyinine has the antibacterial spectrum in vivo, shown in Table VIII:

TABLE VIII
Therapeutic efficacy of decoyinine in experimentally infected mice

| Organism | Route of Administration | $CD_{50}$ in mg./kg. of Decoyinine |
|---|---|---|
| S. hemolyticus | Sub Q | 22.5 (14.8–30.2) |
| | Oral | 50.0 (39.0–61.0) |
| S. aureus | Sub Q | 200 |
| | Oral | 83 (57–109) |
| D. pneumoniae I | Sub Q | 400 |
| | Oral | 800 |
| D. pneumoniae III | Sub Q | 400 |
| | Oral | 800 |
| K. pneumoniae | Sub Q | 400 |
| | Oral | 800 |
| P. multocida | Sub Q | 305 (225–385) |
| | Oral | 238 (163–313) |
| P. vulgaris | Sub Q | 400 |
| | Oral | 800 |
| P. aeruginosa | Sub Q | 355 (287–423) |
| | Oral | 161 (96–226) |
| S. paratyphi B | Sub Q | 482 |
| | Oral | 404 |
| S. typhi | Sub Q | 400 |
| | Oral | 800 |
| E. coli | Sub Q | 119 |
| | Oral | 86 |

Decoyinine has shown marked activity against the following microorganisms.
Bacteria:
  Mycobacterium ranae
  Mycobacterium phlei
  Diplococcus pneumoniae
  Streptococcus hemolyticus
  Staphylococcus aureus
  Pseudomonas aeruginosa
Actinomycetes:
  Nocardia asteroides
Fungi:
  Trichophyton rubrum
  Histoplasma capsulatum
  Blastomyces dermatitidis Decoyinine can be produced by cultivating *S. hygroscopicus* var. *decoyicus* or a variant thereof, which will produce decoyinine, in an aqueous nutrient medium, under submerged aerobic conditions, and preferably, in a nutrient medium containing an assimilable carbohydrate and a nitrogen compound or proteinaceous material. Although there are a number of suitable media available (certain culture media are preferred), for economy of production, maximum yield, and ease of isolation, the presently preferred sources of carbohydrates are glucose, dextrin, molasses, corn meal (refined and unrefined), and starch (bolted and soluble), including combinations thereof. Other suitable carbon sources are maltose, galactose, mannitol, soybean oil, animal and vegetable oils, and the like. The preferred sources of nitrogen are protein sources such as cotton seed metal, soy bean meal, fish meal, defatted soybean meal, peptone, and the like. Other suitable sources are peanut meal, Brewer's yeast (dried yeast cells obtained from a beer fermentation) or yeast extract, corn gluten meal, corn steep liquor, fish stick liquor, animal stick liquor, distiller's solubles, trypticase, tryptone, beef extract, N–Z amine A, N–Z amine B, proteolized milk and egg products, and the like. Combinations of two or more of these nitrogen sources can be used advantageously.

Nutrient inorganic salts, for example, salts capable of yielding ions such as potassium, sodium, calcium, phosphate, sulfate, and the like, can be incorporated advantageously in the medium. Essential trace elements such as zinc, magnesium, manganese, cobalt, iron, and the like, can also be included in the culture medium for growing *Streptomyces hygroscopicus* var. *decoyicus*. Such trace elements are commonly supplied as impurities incidental to the addition of the constituents of the medium.

In a preferred method of fermentation of the microorganism *S. hygroscopicus* var. *decoyicus*, the culture medium is maintained at a temperature between about 24 and about 37 degrees centigrade. Preferably the inoculum is incubated at about 28 degrees centigrade and the inocluated fermentor is incubated at about 28 to 32 degrees centigrade, for a period between about two and seven days, until there is sufficient decoyinine in the fermented beer to be harvested.

For maximum growth and development of *S. hygroscopicus* var. *decoyicus*, the culture medium, prior to inoculation with the microorganism, should be adjusted to a pH between about 6.5 and about 7.6. Advantageously the pH is controlled close to neutrality during the fermentation.

Submerged, aerobic culture conditions are the conditions of choice for the production of large amounts of decoyinine. For the preparation of limited amounts, shaken flasks and cultures in bottles can be employed. When growth is carried out in large vessels and tanks, it is preferable to use the vegetative form of the microorganism for inoculation to avoid a pronounced lag in the production of decoyinine and the attendant inefficient utilization of the equipment. Accordingly, it is desirable first to produce a vegetative inoculum of the microorganism by inoculating a relatively small amount of culture medium with material scraped from a nutrient agar slant of the microorganism, or with an aliquot of a soil culture, and when a young, active, vegetative inoculum has been secured, to transfer the vegetative inoculum aseptically to large vessels or tanks. The medium in which the vegetative inoculum is produced can be the same as, or different from, that utilized for the production of decoyinine.

The rate of production of decoyinine and the concentration of decoyinine in the culture medium are readily followed during the growth period of the microorganism by testing samples of the culture medium for antibacterial activity against an organism known to be susceptible to decoyinine, e.g., *Mycobacterium phlei*, by standard agar diffusion, by a turbidimetric test procedure or by testing by paper chromatography followed by ultraviolet assay. In general, maximum production of decoyinine, after inoculation of the culture medium, occurs between about two and about ten days when submerged aerobic culturing is employed.

*S. hygroscopicus* var. *decoyicus*, on fermentation, produces decoyinine, psicofuranine, and adenine. Adenine is a known old compound which has no antibiotic activity. Psicofuranine is a new antibiotic material which has an optical rotation $[\alpha]_D^{25}$, in dimethylformamide of minus 68 degrees and the following structural formula:

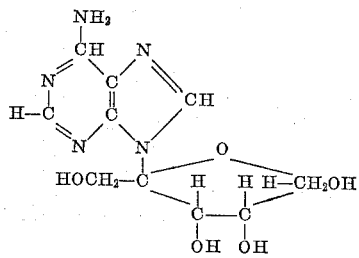

Because of the biological activity of decoyinine both in vitro and in vivo, the antibiotic is useful in many non-human infections.

Decoyinine can be used to prevent the growth of, or to reduce the number of, microorganisms present in various environments. For example, wash solutions containing decoyinine are useful for sanitation purposes, as in the washing of hands and the cleaning of equipment, floors, or furnishings of contamiated rooms or laboratories. It can also be used as an industrial preservative, for example, as a bacteriostatic rinse for laundered clothes and for impregnating papers and fabrics.

Decoyinine can also be used as a feed supplement for promoting the growth of animals and poultry, either alone or in combination with other antibiotics. Its use is also indicated as an additive for pyelographic media, for tuberculosis room and instrument sterilization, and for use in biological media. Decoyinine can also be used in teaching, research, and analysis.

The $LD_{50}$ of decoyinine in mice, both orally and subcutaneously, is greater than 2500 milligrams per kilogram. The maximum tolerated dose orally is greater than 800 milligrams per kilogram per day and subcutaneously greater than 320 milligrams per kilogram per day for at least a four-day period.

Decoyinine, including derivatives disclosed herein, is useful in combating diseases caused by bacterial and fungal infections in animals. For this use, the antibiotic is associated with a pharmaceutical carrier which may be either a solid material, a powder, or a liquid. The compositions can take the form of tablets, effervescent tablets, powders, granules, capsules (both hard and soft shell capsules), suspensions in edible oils, aqueous suspensions, or other dosage forms which are particularly useful for oral administration. Liquid diluents are employed in sterile conditions for parenteral use. Such a medium can be a sterile solvent or a sterile suspending vehicle such as an injectable oil or water with or without hydrophilic colloids such as sodium carboxymethylcellulose, polyvinylpyrrolidone, gelatin, alginates, tragacanth, and like suspending and/or dispersing agents. Various solid pharmaceutical compositions can be prepared by mixing the antibiotic with solid diluents and/or tableting adjuvants such as corn starch, lactose, talc, stearic acid, dicalcium phosphate, magnesium stearate, gums, and the like. Any of the encapsulating or tableting materials used in pharmaceutical practice can be employed where there is no incompatibility with the antibiotic. The materials can be tableted or placed in the usual capsule of absorbable material such as the usual gelatin capsule and administered in that form. Decoyinine including derivatives thereof, illustratively the acetate or the succinate, can be prepared in the form of a suspension in a suitable fixed oil containing about two percent aluminum monostearate as a suspending agent. Such a suspension can be given orally as made or can be encapsulated. The antibiotic in the form of ointments including petrolatum type grease base, polyethylene glycol water-soluble bases, creams, and water-oil emulsions and lotions are useful topically. For veterinary use, the antibiotic can be administered in the form of bougies, mastitis ointments, oil suspensions, aqueous solutions and suspensions, and the like.

The percentage of the active ingredient can be varied depending upon the formulation and the mode of intended use. A smaller percentage can be used if several unit dosage forms are to be administered at the same time. Although, particularly on intravenous injection, a percentage of less than about 0.10 percent of antibiotic can be used, it is preferable to use not less than about 0.10 percent thereof as the effectiveness of the antibiotic increases with the amount of the antibiotic administered. Tablets or capsules containing from about fifty to about 500 milligrams of decoyinine or its derivatives are useful. One or more tablets or capsules can be taken at one time.

Because of its marked bactericidal activity and very low toxicity, decoyinine and its derivatives are useful as agents in the treatment of various diseases. Thus, either alone or in combination with sulfa compounds such as sulfadiazine, sulfamerazine, sulfanilamide, sulfamethazine, sulfacetamide, sulfamethylthiadiazole (in a ratio of about 1 part of the antibiotic to two parts of the total sulfa), and the like, or with other antibiotics such as tetracycline, oxytetracycline, chlortetracycline, penicillins, novobiocin, neomycin, psicofuranine, erythromycin, streptomycin, bacitracin, polymyxin, chloramphenicol, kanamycin, nystatin, streptozotocin, or the like, the antibiotic is useful in the treatment of a variety of infections especially those caused by Streptococcus and Staphylococcus organisms. The antibiotic is likewise useful in combination with the various vitamins such as thiamine, riboflavin, ascorbic acid, niacinamide, pyridoxine, pantothenic acid, or pantothenate salts, vitamin $B_{12}$, folic acid, and the like. Other therapeutically useful materials can also be combined with the antibiotic. Decoyinine and its derivatives are also useful in combination with corticoids, such as cortisone, hydrocortisone, prednisone, and prednisolone, including esters thereof, e.g., the acetate, cyclopentylpropionate, succinate and the sodium salt, and the like; and the fluoro, methyl, and hydroxy analogues of the same, such as 6α-fluorohydrocortisone, 16-hydroxy-9α-fluorohydrocortisone, and 16-methyl-9α-fluoroprednisolone, and the esters thereof.

Decoyinine can be removed from the culture medium by extractive or adsorptive techniques including adsorption on carbon or like capillary adsorbent, and elution therefrom with a suitable eluting agent. Solvent extraction procedures are preferred for commercial production inasmuch as they are less time consuming and expensive, and higher recovery yields are obtained thereby.

In an extraction procedure for recovery of decoyinine from the fermented nutrient medium the whole beer is filtered at an acid pH, preferably at about pH 2. The clear filtrate is adjusted to the alkaline side, preferably to about pH 10, and adsorbed on an adsorbent, preferably carbon, to about one percent activated carbon. The cake is slurried in an organic solvent, such as acetone, the solvent is separated from the cake, and the solvent is distilled to an aqueous concentrate which is filtered, neutralized, and freeze dried. The freeze dried material is redissolved in water at about 50 degrees centigrade and allowed to cool to room temperature whereupon crystallization takes place.

Decoyinine can be further purified by counter-current distribution, counter-current liquid-liquid extraction or other means and then recrystallized from a suitable solvent.

Decoyinine exhibits a typical picture in a bioautographed papergram on the 6-solvent systems as given below. Location of zones is by bioautography with *Mycobacterium phlei* or *M. ranae*.

The six solvent systems and $R_f$ values are as follows (the remainder being water):

(1) 81% n-butanol; $R_f=0.30$
(2) 81% n-butanol, 0.25% p-toluene sulfonic acid; $R_f=0.35$
(3) n-butanol-acetic acid water (2:1:1); $R_f=0.55$
(4) 81% n-butanol, 2% piperidine; $R_f=0.37$
(5) 96% water, 4% n-butanol; $R_f=0.63$
(6) 96% water, 4% n-butanol, 0.25% p-toluene sulfonic acid; $R_f=0.64$ The $R_f$ value of 6-amino-9-D-psicofuranosyl purine, or psicofuranine, also produced by *S. hydroscopicus*, NRRL 2666, in solvent system #4 is 0.13. The $R_p$ value of decoyinine is 2.85 (p is the reference compound psicofuranine).

Decoyinine, as well as psicofuranine, is produced as an elaboration product by the fermentation of *S. hygroscopicus* var. *decoyicus*. Decoyinine can be separated from psicofuranine by Craig countercurrent distribution using a solvent system of equal parts of n-butanol and water. The distribution will yield a fraction at K=0.3 which is psicofuranine and a fraction at K=0.7 which is decoyinine. Both decoyinine and psicofuranine yield adenine on acid hydrolysis. Decoyinine is soluble in the range of 1 to 10 mg. per ml. in water, lower alkanols such as ethanols, methanol, and butanol, lower alkanones such as acetone, and esters such as ethyl acetate, and more soluble in organic solvents such as dimethylformamide, dimethyl sulfoxide, and dimethyl acetamide.

Acylation of decoyinine produces the tri-, tetra- and pentaacyl derivatives. For example, acetylation of decoyinine by the method of Yüntsen produces two products, decoyinine tetraacetate ($C_{19}H_{21}N_5O_8$) and decoyinine pentaacetate ($C_{21}H_{23}N_5O_9$). Acetylation of decoyinine at a low temperature with a minimum of acetic anhydride for a minimum reaction period produces decoyinine triacetate. The triacyl derivatives can be illustrated as follows:

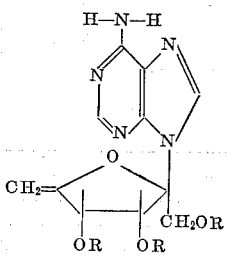

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower-alkoxycarbonyl.

The tetra and pentaacyl derivatives can be illustrated as follows:

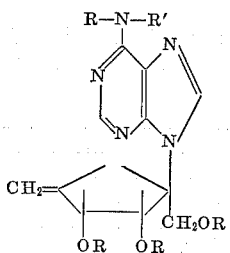

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms inclusive; and lower-alkoxycarbonyl; and wherein R' is selected from the class consisting of hydrogen and hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms inclusive; and lower-alkoxycarbonyl.

Decoyinine triacylate can be deacylated with ammonia to produce purified decoyinine and hydrogenated to produce dihydrodecoyinine triacylate which can be represented by the following structural formula:

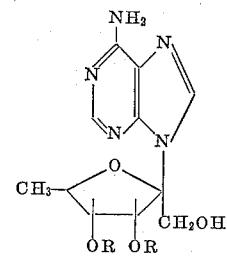

wherein R is the same as described above for decoyinine triacylate. Concomitantly produced with dihydrodecoyinine triacylate is anhydrodihydrodecoyinine diacylate which can be represented by the following structural formula:

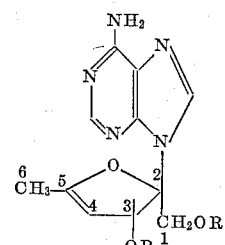

wherein R is the same as described above for decoyinine triacylate. Available evidence indicates that the hydrogenolysis takes place at the 4-position as shown but does not entirely negate the possibility of the hydrogenolysis taking place at the 1- or 3-position. Dihydrodecoyinine triacylate and anhydrodihydrodecoyinine diacylate can be deacylated with ammonia to produce dihydrodecoyinine and anhydrodihydrodecoyinine. If desired, dihydrodecoyinine and anhydrodihydrodecoyinine can be acylated in the same manner as described above for decoyinine to produce dihydrodecoyinine, tri-, tetra-, and pentaacylates, and anhydrodihydrodicoyinine di-, tri-, and tetra-acylates.

The acylates, described above, are useful in upgrading decoyinine and dihydro- and anhydrodihydrodecoyinine. For example, the acetates can be separated from the parent compounds by countercurrent distribution because of the difference in "K" values. After separation, the acetates can be converted back to their parent compounds as described above, thereby resulting in the purification of the parent compound.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated, or unsaturated cycloaliphatic carboxylic acid, for example, cyclobutane-carboxylic acid, cyclipentane-carboxylic acid, methylcyclopentene-carboxylic acid, cyclohexane-carboxylic acid, dimethylcyclohexene-carboxylic acid, dipropylcyclohexane-carboxylic acid, and the like; (c) a saturated or unsaturated cycloaliphatic-substituted aliphatic carboxylic acid, for example, cyclopentane-acetic acid, cyclopentane-propionic acid, cyclopentene-acetic acid, cyclohexane-butyric acid, methylcyclohexane-acetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, naphthylacetic acid, and the like.

The term "halo-, nitro-, hydroxy-, amino-, cyano-, thiocyano-, and lower-alkoxy-substituted hydrocarbon carboxylic acid acyl of from two to twelve carbon atoms, inclusive" is intended to mean hydrocarbon carboxylic acid acyl as hereinbefore defined which are substituted by one or more halogen atoms, nitro-, hydroxy-, amino-, cyano, thiocyano-, or lower-alkoxy groups. By "lower-alkoxy" is meant an alkoxy group of from one to six carbon atoms, inclusive, for example, methoxy, ethoxy, propoxy, butoxy, pentyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, ethoxyformic (ethyl hemicarbonate), and the like.

Upon hydrolysis of decoyinine, dihydrodecoyinine and anhydrodihydrodecoyinine the sugar moiety of the molecule splits off. The sugar moiety splitting off from decoyinine has three acylatable hydroxyls; the dihydrodecoyinine sugar moiety also has three acylatable hydroxyls; and the anhydrodihydrodecoyinine sugar moiety has two acylatable hydroxyls. These novel sugars can be acylated in the manner described above for decoyinine to provide esters which are useful in upgrading the sugars or for protecting the hydroxyls when the sugar is used as an intermediate as, for example, in the preparation of other N-glycosides.

Novel polyols are obtained when the sugar moiety of decoyinine, dihydrodecoyinine and anhydrodihydrodecoyinine are hydrogenated using Raney nickel as catalyst. These novel polyols can be used in place of such substances as sorbitol, mannitol, and pentaerythritol as levigating agents in pharmaceutical compositions, as humectants and softening agents for tobacco, glue, lotions and creams and the like, and as plasticizers. Like the prior art polyols, these novel polyols are also converted to surfactants useful as detergent and wetting agents by monoacylation with long chain fatty acid radicals, for example, lauric acid, palmitic acid, stearic acid, and oleic acid. Like polyacylates, for example, the distearate, can be used as ointment bases. The capric acid monoester when prepared and formulated according to U.S. Patents 2,357,077 and 2,357,078 is useful as an insecticide. The esters with drying oil acids such as linseed oil acid, when prepared according to Industrial and Engineering Chemistry, 37, 809–12 (1945), are useful as drying oils in varnish and the like.

Methanolysis cleaves adenine from decoyinine. Our data indicate that the sugar moiety of decoyinine is $C_6H_{12}O_5$ whereas angustmycin A yields $C_8H_{10}O_5$. Sodium borohydride fails to reduce decoyinine and this shows the absence of an aldo-ketose sugar such as is found in hygromycin.

Decoyinine occurs as a crystalline hydrate, Preparation 2e, having a melting point of 124–128 degrees centigrade and as an anhydrous crystal, Preparation 2f, having a melting point 183–186 degrees centigrade. Decoyinine is also characterized by the ultraviolet maximum at 258 millimicrons, a=56, of the anhydrous crystalline material in alcoholic 0.01 N sulfuric acid as shown in FIGURE 2; $[\alpha]_D^{25}=+18.6$ degrees in dimethyl formamide and +37 degrees in dimethyl sulfoxide.

The infrared spectrum shows multiple OH/NH bands, as well as a series of bands indicating a purine ring structure, as shown on the anhydrous crystalline decoyinine in FIGURE 1. The infrared absorption spectrum of decoyinine in a mineral oil suspension exhibits characteristic absorption bands expressed in reciprocal centimeters at the following frequencies: 3420, 3390, 3300, 3170, 3070, 2710, 2640, 1690, 1672, 1655, 1645, 1605, 1573, 1565, 1515, 1420, 1335, 1310, 1300, 1280, 1238, 1218, 1181, 1143, 1102, 1094, 1085, 1073, 1060, 1047, 1013, 985, 965, 915, 883, 838, 815, 790, 772, 746, and 725.

The following examples are illustrative of the process and products of the present invention, but are not to be construed as limiting. All percentages are by weight and all solvent mixture proportions are as volume by volume unless otherwise noted.

EXAMPLE 1

A. *Laboratory scale fermentation*

*S. hygroscopicus* var. *decoyicus*, NRRL 2666, was cultured at 28 degrees centigrade on sterile slants of the following medium:

| | Grams |
|---|---|
| Maltose | 10 |
| Tryptone | 5 |
| Dipotassium hydrogen phosphate | 0.5 |
| Sodium chloride | 0.5 |
| Hydrated iron sulfate trace. | |
| Agar | 15 |
| Distilled water to make 1 liter. | | for seven days, when sporulation was complete. The spores from such an agar slant were used to inoculate 100 milliliters of the following seed medium in a 500-milliliter flask:

| | Grams |
|---|---|
| Glucose | 25 |
| Soy peptone | 10 |
| Corn steep liquor | 3 |
| Yeast extract | 3 |
| N–Z amine A[1] | 2 |
| Ammonium sulfate | 3 |
| Magnesium sulfate | 0.2 |
| Sodium chloride | 0.1 |
| Hydrated iron sulfate | 0.02 |
| Hydrated manganese sulfate | 0.003 |
| Hydrated zinc sulfate | 0.004 |
| Dihydrogen potassium phosphate | 1.9 |
| Monohydrogen potassium phosphate | 1.1 |
| Adjusted to pH 7.2 before sterilizing. | |
| Water to make 1 liter. | |

[1] Enzymatic digest of casein.

which was incubated for 72 hours at 28 degrees centigrade on a rotary shaker at 250 r.p.m.

The culture thus obtained was used to inoculate the following sterile fermentation medium:

| | Grams |
|---|---|
| Kay-soy[1] | 30 |
| Ammonium sulfate | 5 |
| Glycerol | 40 |
| Cerelose | 20 |
| Calcium carbonate | 4 |
| Water to make 1 liter. | |
| (pH adjusted to 7.2 before sterilizing). | |

[1] Fat-extracted soybean meal, finely milled.

then incubated in 100 milliliter aliquots in 500 milliliter Erlenmeyer flasks for five days (at thirty degrees centigrade) on a rotary shaker at 250 r.p.m.

An aliquot of the whole beer was fractionated by paper chromatography. The zone of decoyinine was located by bioautography with *Mycobacterium phlei*. The zones of psicofuranine and adenine, which were also present in the whole beer, were located by a Cary spectophotometer by their absorption at 262 m$\mu$. The relative mobilities ($R_f$) of the fractions, in a solvent system consisting of 81% n-butanol, 2% piperidine, and 17% water, are decoyinine $R_f=0.37$, psicofuranine $R_f=0.13$, and adenine $R_f=0.25$.

EXAMPLE 2

A. Plant scale fermentation

The inoculated medium, in a 500 milliliter seed flask, as described in Example 1, was incubated for 48 hours at 30 degrees centigrade. Then 75 milliliters of it were used to inoculate 12 liters of the same medium in a seed bottle. The seed bottle was agitated with a sweep stirrer at 280 r.p.m., aerated with 6 standard liters of air per minute, and fermented at 30 degrees centigrade for two days when it was used as inoculum for 250 liters of a definitive sterile fermentation medium of the same composition as used in Example 1, in a 100 gallon tank. The medium was adjusted to pH 7.2 with NaOH and then sterilized. After sterilizing the pH was 7.8. The fermentor was agitated with an open turbine at 280 r.p.m., aerated with 100 standard liters of air per minute, and fermented at 30 degrees centigrade for 4 days at which time the decoyinine was harvested.

B. Extraction of crude cyrstalline decoyinine

The whole beer, 250 liters, was adjusted to pH 2.0 with sulfuric acid, 22 pounds of diatomite were added and the material was filtered. The filtrate was mixed with 11 pounds of activated carbon and 16 pounds of diatomite, and the mixture was filtered. The clear filtrate was discarded, the decoyinine being in the carbon cake. The carbon cake was eluted three times with 5 gallons each time of acetone to remove the decoyinine. The acetone solution was concentrated at 38 to 48 degrees centigrade to an aqueous solution of 4 liters. The aqueous solution was adjusted with thirteen milliliters of concentrated sulfuric acid to pH 7.0 and then freeze-dried to yield 414 grams of solid crude decoyinine. The freeze-dried material was dissolved in 2 liters of water at 50 degrees centigrade and allowed to cool to room temperature to effect crystallization of crude crystalline decoyinine, Preparation 2a, which had a melting point of 198–200 degrees centigrade.

C. Fractionation of crude crystalline decoyinine

One gram of Preparation 2a was fractionated by Craig counter-current distribution using a solvent system consisting of equal parts of n-butanol and water through 150 transfers. Three fractions were obtained which on evaporation of the solvent gave crystalline products as shown in Table X.

D. Other fractionations of crude crystalline decoyinine

A one gram aliquot of crude crystalline decoyinine, prepared by the procedure of part B, was fractionated in a 200-tube Craig counter-current distribution machine for 200 transfers in the same solvent system as used in part C. The solids determination indicated three weight peak fractions: K=0.29, psicofuranine; K=0.73 decoyinine; and K=1.69, adenine. Each of the fractions was evaporated to dryness. The decoyinine was recrystallized from water to yield 210 milligrams of hydrated crystalline decoyinine, Preparation 2e, which melted at 124–126 degrees centigrade. The elemental analysis of Preparation 2e, after drying at 60 degrees centigrade, was as follows:

Calculated for $C_{11}H_{13}N_5O_4$: C, 46.97; H, 5.38; N, 22.75; O, 24.92. Found: C, 46.02; H, 5.16; N, 23.29; O, 24.90 (direct).

The ultra violet spectrum of Preparation 2e showed a maxima at 261 m$\mu$, a=53.2 in 0.1 N potassium hydroxide and at 259 m$\mu$, a=50.8 in 0.01 N sulfuric acid.

In another fractionation, 40 grams of crude decoyinine prepared according to part B, yielded 7.8 grams of hydrated crystalline decoyinine similar to Preparation 2e, one gram of which was recrystallized from 40 milliliters of absolute ethanol to yield anhydrous crystalline decoyinine, Preparation 2f, which melted at 183–186 degrees centigrade. After drying at 60 degrees centigrade, Preparation 2f had the following elemental analysis: C, 47.11; H, 5.03; N, 25.03; O, 23.01 (direct). The infrared absorption spectrum and ultraviolet spectrum of Preparation 2f are shown in the drawings, FIGURES 1 and 2, respectively.

E. Fractionation by liquid-liquid extraction

Crude crystalline decoyinine prepared according to part B was factionated by liquid-liquid countercurrent extraction. The solvent system consisted of equal parts of n-butanol and water. One hundred grams of crude crystalline decoyinine was dissolved in one liter each of hot upper and lower phases of the solvent system. This solution was used as feed for the column. The effluent of the liquid-liquid counter-current extraction column was followed by ultraviolet analysis, solids, and bioassay. There was crystallized from the bioactive fraction of the effluent 22.5 grams of decoyinine, Preparation 2g, which melted at 125–130 degrees centigrade and had an optical rotation of $[\alpha]_D^{25}=+35.6$ (1% in water).

EXAMPLE 3

To a solution of 2 grams of Preparation 2f in 50 milliliters of pyridine was added 25 milliliters of acetic anhydride. The mixture was stored for seven days at 25 degrees centigrade. Eighteen grams of cracked ice were added to the mixture which was stirred for one and one-half hours, after which it was concentrated to a thick syrup under high vacuum. The syrup was dissolved in chloroform, washed with water and 0.03 N sulfuric acid, dried over sodium sulfate, and evaporated to dryness. The dried syrup was dissolved in ether and precipitated therefrom by the addition of hexane to yield 1.7 grams of a white solid, Preparation 3a. Preparation 3a was further purified by Craig countercurrent distribution wherein the solvent system water:ethanol:acetate:cyclohexane in the volume proportions 30:20:25:25 was used. After 1000 transfers two fractions were obtained. The first fraction at K=1.86, was crystallized from water to yield 420 milligrams of a material, Preparation 3b, which had a melting point 152–153 degrees centigrade and an elemental analysis which corresponds to decoyinine pentaacetate:

Calculated for $C_{21}H_{23}N_5O_9$: C, 51.32; H, 5.13; N, 14.25; O, 29.32. Found: C, 51.80; H, 4.71; N, 13.84; O, 30.50 (direct).

The second fraction at K=0.5 was crystallized from

TABLE X

|  | Psicofuranine, Preparation 2b | Monohydrate decoyinine, Preparation 2c | Adenine, Preparation 2d |
|---|---|---|---|
| Fraction | First, K=.282 | Second, K=0.705 | Third, K=1.5. |
| Weight recovered | 388 mg | 260 mg | 110 mg. |
| Calculated percent of Prep. 2a | 44% | 34% | 22%. |
| Melting point, °C | 209–210 | 124–125 | 292–295. |
| U.V. maxima at 262 m$\mu$ in water | a=61 | a=57 | a=105. |
| $[\alpha]_D^{23}$ in water | −46° | −41° |  |
| Elemental analyses: |  |  |  |
| C | 45.82 | 44.32 |  |
| H | 5.18 | 4.94 |  |
| O | 28.63 | 26.67 |  |
| N | 23.04 | 23.55 | 49.5. | ethyl acetate-hexane to yield 600 milligrams of a material, Preparation 3c, which had a melting point of about 65 degrees centigrade and an elemental analysis which corresponds to decoyinine tetraacetate.

Calculated for $C_{19}H_{21}N_5O_8$: C, 50.76; H, 5.16; N, 15.58; O, 28.48. Found: C, 50.95; H, 4.59; N, 15.24; O, 28.81 (direct).

In a like manner other acylations of decoyinine can be made, particularly with the lower hydrocarbon carboxylic acid acylating agents, by reacting the appropriate acid anhydride, or acid halide, such as propionic anhydride, acrylic anhydride, butyric anhydride, benzoic anhydride, benzoyl chloride, acetyl chloride, caproyl bromide with decoyinine in pyridine solution. The lower hydrocarbon carboxylic acid acylates can be used in place of decoyinine.

The process of acylation can be applied to crude preparations of decoyinine advantageously as means of upgrading decoyinine. Thus the acylated decoyinine can be separated from the reaction mixture, purified, and then hydrolyzed with dilute aqueous alkali to yield purified decoyinine. In this way decoyinine is readily separated from non-acylatable impurities and advantage is taken of the change in physical properties due to acylation.

EXAMPLE 4

10,000 oral tablets each containing 500 milligrams of decoyinine were prepared from the following types and amounts of materials:

|  | Grams |
|---|---|
| (1) Decoyinine, crystalline | 5000 |
| (2) Lactose | 1500 |
| (3) Corn starch | 250 |
| (4) Talc | 100 |
| (5) Magnesium stearate | 50 |

Finely powdered materials 1, 2, and 3, were mixed thoroughly, slugged, and then granulated; the granules were mixed with materials 4 and 5 and tableted. The tablets, when administered were stable and showed pronounced antibiotic activity.

Similar results were obtained with tablets made using 2500 grams of decoyinine and 2500 grams of psicofuranine in place of the 5000 grams of decoyinine.

Similar results were obtained with tablets made using 2500 grams of decoyinine and 2500 grams of erythromycin in place of the 5000 grams of decoyinine.

Similar results were obtained with tablets made using 2500 grams of decoyinine and 2500 grams of nystatin in place of the 5000 grams of decoyinine.

EXAMPLE 5

Decoyinine triacetate

To a solution of 2.5 grams of decoyinine (Preparation 2f, described in Example 2, part D) in 20 milliliters of pyridine at 4 degrees centigrade was added 8 milliliters of acetic anhydride. The mixture was stored overnight at room temperature. On the addition of 3 volumes of ice water (1 to 3 degrees centigrade) to the mixture, crystallization occurred thus yielding 1.65 grams of decoyinine triacetate crystals having a melting point range of 171 to 185 degrees centigrade. Recrystallization from 25 milliliters ethanol yielded 1.05 grams of decoyinine triacetate crystals having a melting point range of 188 to 190 degrees centigrade; an ultraviolet maximum at 258 millimicrons, a=56, in alcoholic 0.01 N sulfuric acid; and the following elemental analysis:

Calculated for $C_{17}H_{19}N_5O_7$: C, 50.37; H, 4.72; N, 17.28; O, 27.63. Found: C, 50.47; H, 4.62; N, 17.59; O, 27.50.

EXAMPLE 6

Dihydrodecoyinine triacetate 16.7 grams of decoyinine triacetate (prepared as in Example 5) and 2 grams of platinum oxide catalyst in 200 milliliters of ethanol were shaken two hours in 40 p.s.i. of hydrogen. The pressure drop was 3½ to 4 p.s.i. The mixture was filtered and the filtrate evaporated to dryness and then dissolved in about 50 milliliters of ethyl acetate. On the addition of about 5 milliliters of Skellysolve B (isomeric hexanes) crystallization of dihydrodecoyinine triacetate occurred. The crystals were recovered by filtration and dried to yield 6 grams of dihydrodecoyinine triacetate which melted at 102–105 degrees centigrade. Recrystallization from the same solvent mixture yielded dihydrodecoyinine triacetate crystals melting at 147–149 degrees centigrade.

EXAMPLE 7

Dihydrodecoyinine and anhydrodihydrodecoyinine 3.5 grams of dihydrodecoyinine triacetate (prepared as in Example 6) was dissolved in 100 milliliters of cold methanol saturated with ammonia. The solution was refrigerated overnight. Crystals which precipitated were recovered by filtration yielding 820 milligrams and having a melting point of 149–157 degrees centigrade (Preparation 1). The filtrate was evaporated under vacuum to dryness to yield 650 millgrams (Preparation 2). Papergrams of the two preparations showed that each had at least two components. Preparations 1 and 2 were then mixed to give Preparation 3, 1.25 grams of which was distributed in the Craig countercurrent apparatus for 200 transfers using a solvent system n-butanol:water (1:1). Two fractions were recovered. Fraction A with a k-value of 1.57 (680 milligrams), identified as anhydrodihydrodecoyinine, had a melting point of 150–153 degrees centigrade and the following elemental analysis:

Calculated for $C_{11}H_{13}N_5O_3$: C, 50.18; H, 4.98; N, 26.61; O, 18.23. Found: C, 49.64; H, 5.16; N, 26.10; O, 19.78.

Fraction B with a k-value of 0.64 (200 milligrams), identified as dihydrodecoyinine, had a melting point range of 205–208 degrees centigrade and had the following elemental analysis:

Calculated for $C_{11}H_{15}N_5O_4$: C, 46.97; H, 5.38; N, 24.90; O, 22.76. Found C, 46.89; H, 5.52; N, 24.90; O, 23.50.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the formula:

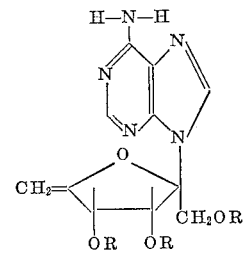

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxy-carbonyl.

2. Decoyinine tri-lower alkanoate.

3. Decoyinine triacetate.

4. A novel composition of matter, dihydrodecoyinine, having the following structural formula:

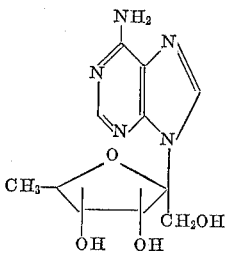

5. A novel composition of matter, anhydrodihydrodecoyinine, having the following structural formula:

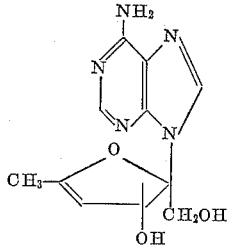

6. A compound of the formula:

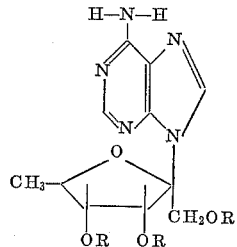

wherein R is selected from the group consisting of hydrocarbon carboxylic acid acyl of from two to twelve carbon atoms, inclusive; halo-, nitro-, hydroxy-, amino-, cyano-, thiocyano-, and lower alkoxy-substituted hydrocarbon carboxylic acid acyl of from two to twelve carbon atoms, inclusive; and lower alkoxycarbonyl.

7. Dihydrodecoyinine tri-lower-alkanoate.
8. Dihydrodecoyinine triacetate.
9. A compound of the formula:

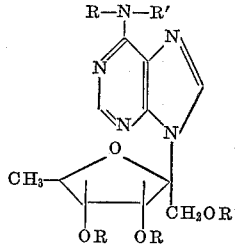

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxy-carbonyl; and wherein R' is selected from the class consisting of hydrogen and hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxy-carbonyl.

10. Dihydrodecoyinine tetra-lower-alkanoate.
11. Dihydrodecoyinine penta-lower-alkanoate.
12. A compound of the formula:

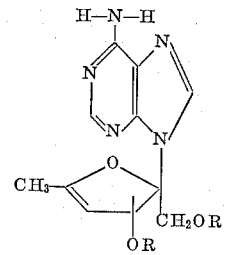

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxycarbonyl.

13. Anhydrodihydrodecoyinine di-lower-alkanoate.
14. A compound of the formula:

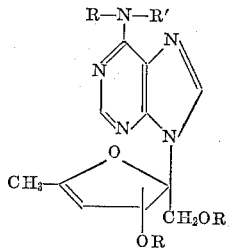

wherein R is selected from the group consisting of hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxycarbonyl, and wherein R' is selected from the class consisting of hydrogen and hydrocarbon carboxylic acid acyl of from two to twelve carbon atoms, inclusive; halo-, nitro-, hydroxy-, amino-, cyano-, thiocyano-, and lower-alkoxy-substituted hydrocarbon carboxylic acid acyl of from two to twelve carbon atoms, inclusive; and lower alkoxycarbonyl.

15. Anhydrodihydrodecoyinine tri-lower-alkanoate.
16. Anhydrodihydrodecoyinine tetra-lower-alkanoate.

References Cited by the Examiner

UNITED STATES PATENTS

| | | | |
|---|---|---|---|
| 3,002,965 | 10/61 | Fox et al. | 260—211.5 |
| 3,014,900 | 12/61 | Schroeder | 260—211.5 |
| 3,094,460 | 6/63 | De Boer et al. | 260—211.5 |

OTHER REFERENCES

Pigman: "The Carbohydrates," 1957, page 248, Academic Press, Inc., New York, N.Y.

LEWIS GOTTS, *Primary Examiner.*

UNITED STATES PATENT OFFICE
CERTIFICATE OF CORRECTION

Patent No. 3,207,750                              September 21, 1965

Clarence De Boer et al.

It is hereby certified that error appears in the above numbered patent requiring correction and that the said Letters Patent should read as corrected below.

Column 1, line 33, for "787,967" read -- 787,976 --; line 39, for "konwn" read -- known --; lines 70 and 71, for "new from" read -- new variety of a known actinomycete which has been isolated from --; column 2, line 71, strike out "variety of a known actinomycete which has been isolated"; column 6, lines 65 to 75, for that portion of the formula reading

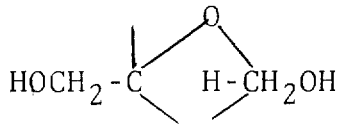            read            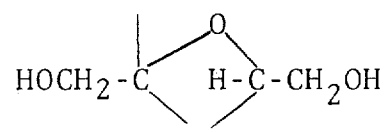

column 10, lines 3 to 13, for that portion of the formula reading "$\overset{|}{C}H_2OH$" read -- $\overset{|}{C}H_2OR$ --; line 63, for "cyclipentane-" read -- cyclopentane- --; column 14, line 5, for "0.1" read -- 0.01 --; line 22, for "factionated" read -- fractionated --.

Signed and sealed this 17th day of May 1966.

(SEAL)
Attest:

ERNEST W. SWIDER                                  EDWARD J. BRENNER
Attesting Officer                                 Commissioner of Patents